(12) United States Patent
Song et al.

(10) Patent No.: US 11,056,709 B2
(45) Date of Patent: Jul. 6, 2021

(54) FUEL CELL STACK STRUCTURE

(71) Applicant: MICO POWER LTD., Anseong-si (KR)

(72) Inventors: Sang Hyun Song, Hwaseong-si (KR); Song Ho Choi, Hwaseong-si (KR); Jin Ah Park, Hwaseong-si (KR)

(73) Assignee: MICO POWER LTD., Anseong-si (KR)

(*) Notice: Subject to any disclaimer, the term of this patent is extended or adjusted under 35 U.S.C. 154(b) by 128 days.

(21) Appl. No.: 16/097,931

(22) PCT Filed: Mar. 21, 2017

(86) PCT No.: PCT/KR2017/003009
§ 371 (c)(1),
(2) Date: Oct. 31, 2018

(87) PCT Pub. No.: WO2017/195978
PCT Pub. Date: Nov. 16, 2017

(65) Prior Publication Data
US 2019/0148758 A1 May 16, 2019

(30) Foreign Application Priority Data
May 10, 2016 (KR) .................. 10-2016-0057115

(51) Int. Cl.
*H01M 8/00* (2016.01)
*H01M 8/248* (2016.01)
(Continued)

(52) U.S. Cl.
CPC ......... *H01M 8/248* (2013.01); *H01M 8/0202* (2013.01); *H01M 8/249* (2013.01); *H01M 8/2428* (2016.02)

(58) Field of Classification Search
None
See application file for complete search history.

(56) References Cited

U.S. PATENT DOCUMENTS

2005/0186462 A1* 8/2005 Belanger ............ H01M 8/0276
429/458
2008/0138684 A1* 6/2008 Lewinski ............ H01M 8/2415
429/434
(Continued)

FOREIGN PATENT DOCUMENTS

KR 10-2010-0045500 A 5/2010
KR 10-2011-0014369 A 2/2011
(Continued)

OTHER PUBLICATIONS

International Search Report for PCT/KR2017/003009, dated Jun. 30, 2017.

*Primary Examiner* — Milton I Cano
*Assistant Examiner* — Mary G Henshaw
(74) *Attorney, Agent, or Firm* — Sughrue Mion, PLLC

(57) ABSTRACT

A fuel cell stack array is disclosed. The fuel cell stack array includes a first fuel cell stack having a first upper frame structure formed with a first through-hole for exposing a first topmost connector layer positioned at top of a first single cell stack structure, a second fuel cell stack having a second upper frame structure formed with a second through-hole for exposing a second topmost connector layer positioned at top of a second single cell stack structure, and a first current collector electrically connecting the first and second topmost connector layers via the first and second through-holes.

13 Claims, 2 Drawing Sheets

(51) Int. Cl.
    *H01M 8/249*     (2016.01)
    *H01M 8/0202*     (2016.01)
    *H01M 8/2428*     (2016.01)

(56) References Cited

U.S. PATENT DOCUMENTS

| | | | | |
|---|---|---|---|---|
| 2009/0162723 A1* | 6/2009 | Zhan | ............ | H01M 8/2428 |
| | | | | 429/458 |
| 2011/0269052 A1* | 11/2011 | Haltiner, Jr. | ........ | H01M 8/249 |
| | | | | 429/458 |
| 2014/0120450 A1* | 5/2014 | Gil | ............ | H01M 8/243 |
| | | | | 429/469 |

FOREIGN PATENT DOCUMENTS

| | | |
|---|---|---|
| KR | 10-2011-0129513 A | 12/2011 |
| KR | 10-2015-0001402 A | 1/2015 |
| KR | 10-2015-0060830 A | 6/2015 |

\* cited by examiner

[FIG. 1]
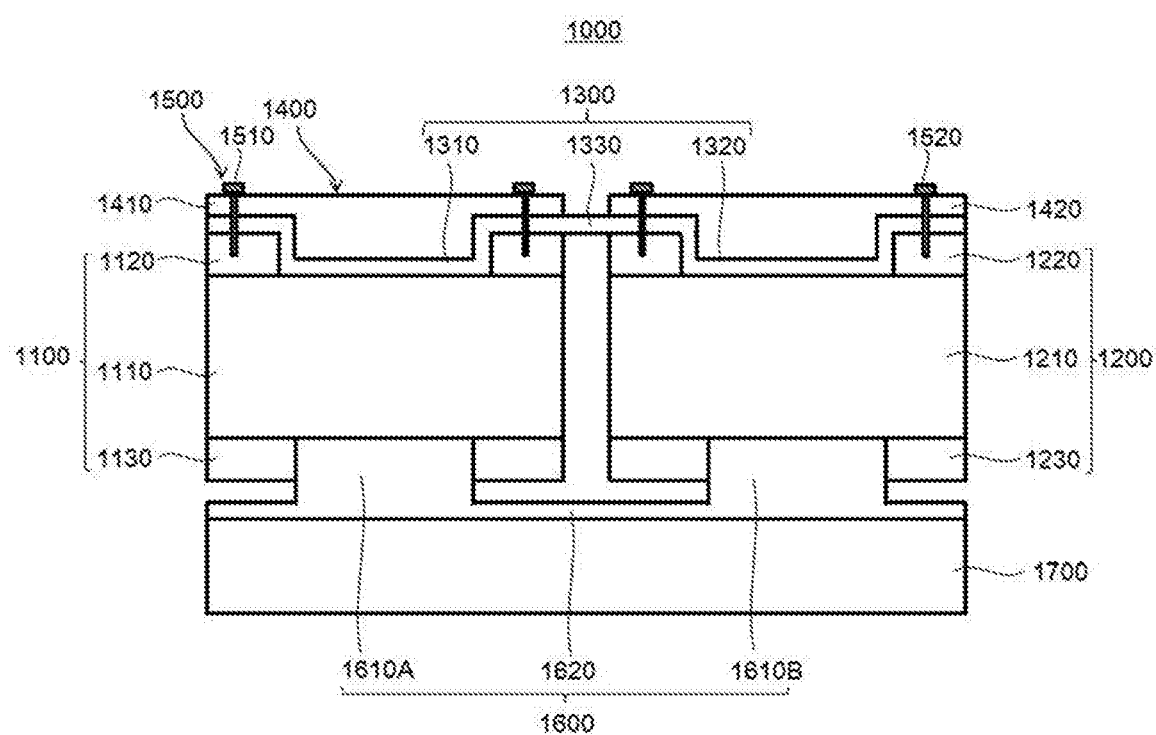

[FIG. 2]
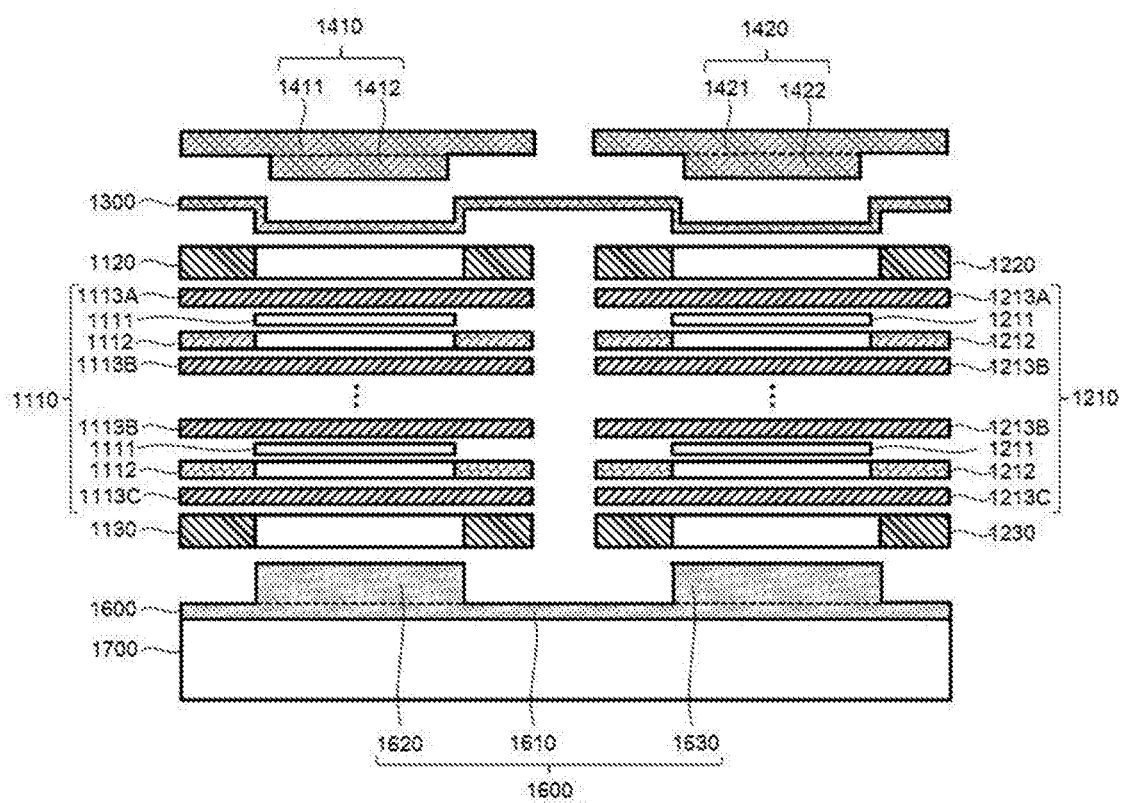

FUEL CELL STACK STRUCTURE

CROSS-REFERENCE TO RELATED APPLICATION

This Application is a National Stage of International Application No. PCT/KR2017/003009 filed Mar. 21, 2017, claiming priority based on Korean patent application No. 10-2016-0057115 filed on May 10, 2016, the entire content of which is incorporated herein by reference for all purposes as if fully set forth herein.

BACKGROUND

Field of the Present Disclosure

The present disclosure relates to a fuel cell stack array, which relates to a stack array of a fuel cell that generates an electrical energy via an electrochemical reaction.

Discussion of Related Art

The fuel cell directly converts chemical energy of raw material into electrical energy via an electrochemical reaction. It has advantages that an energy efficiency is remarkably higher than that of a common heat engine and a discharge of pollutant is little.

The fuel cell may be divided diversely depending on a type of a single cell. Of these, a planar fuel cell has an advantage of obtaining a high power density and are being widely developed.

In general, a planar fuel cell system uses a plurality of fuel cell stacks formed by stacking a plurality of single cells for a high output, by electrically connecting them to each other. In this case, there is a problem that the electric energy is lost due to an occurrence of contact resistance in electrically connecting the plurality of fuel cell stacks with each other.

SUMMARY

A purpose of the present disclosure is to provide a fuel cell stack array with significantly improved current collection efficiency.

In one aspect of the present disclosure, there is provided a fuel cell stack array comprising: a first fuel cell stack including: a first single cell stack structure, wherein the first single cell stack structure has a first topmost connector layer; a first upper frame structure disposed on a top of the first topmost connector layer and having a first through-hole defined therein; and a first lower frame structure disposed at on a bottom of the first single cell stack structure; a second fuel cell stack including: a second single cell stack structure, wherein the second single cell stack structure has a second topmost connector layer; a second upper frame structure disposed on a top of the second topmost connector layer and having a second through-hole defined therein; and a second lower frame structure disposed at on a bottom of the second single cell stack structure, wherein the second fuel cell stack is adjacent to the first fuel cell stack; and a first current collector including: a first contact inserted into the first through-hole and electrically connected to the first topmost connector layer; a second contact inserted into the second through-hole and electrically connected to the second topmost connector layer; and a connection portion disposed on tops of the first and second upper frame structures for electrically connecting the first and second contacts, wherein the first current collector electrically connects the first and second topmost connector layers.

In one embodiment, the first contact includes: a first bottom portion disposed on the first topmost connector layer and in the first through-hole; and a first sidewall portion vertically extending from an edge of the first bottom portion and along a sidewall of the first upper frame structure defined by the first through-hole, wherein the first sidewall portion is connected to the connection portion, wherein the second contact includes: a second bottom portion disposed on the second topmost connector layer and in the second through-hole; and a second sidewall portion vertically extending from an edge of the second bottom portion and along a sidewall of the second upper frame structure defined by the second through-hole, wherein the second sidewall portion is connected to the connection portion.

In one embodiment, a first conductive paste, conductive mesh structure, or conductive elastic plate is disposed between the first bottom portion and the first topmost connector layer, wherein a second conductive paste, conductive mesh structure, or conductive elastic plate is disposed between the second bottom portion and the second topmost connector layer.

In one embodiment, the fuel cell stack array further includes: a first pressing jig for pressing the first contact against the first topmost connector layer; and a second pressing jig for pressing the second contact against the second topmost connector layer.

In one embodiment, the first pressing jig includes: a first plate portion disposed outside the first through-hole for pressing the connection portion of the first current collector against the first upper frame structure; and a first protruding portion protruding from a bottom face of the first plate portion and inserted into the first through-hole to press the first contact against the first topmost connector layer, wherein the second pressing jig includes: a second plate portion disposed outside the second through-hole for pressing the connection portion of the first current collector against the second upper frame structure; and a second protruding portion protruding from a bottom face of the second plate portion and inserted into the second through-hole to press the second contact against the second topmost connector layer.

In one embodiment, the fuel cell stack array further includes: a first fastener for fastening the first pressing jig to the first upper frame structure; and a second fastener for fastening the second pressing jig to the second upper frame structure.

In one embodiment, the first fastener includes a plurality of first fastening screws passing through the first pressing jig so as to be inserted into the first upper frame structure, wherein the second fastener includes a plurality of second fastening screws passing through the second pressing jig so as to be inserted into the second upper frame structure.

In one embodiment, the first topmost connector layer is electrically connected to a fuel electrode of the first single cell stack structure, and the second topmost connector layer is electrically connected to a fuel electrode of the second single cell stack structure, such that the first current collector connects the first single cell stack structure and the second single cell stack structure in an electrical parallel manner.

In one embodiment, the first topmost connector layer is electrically connected to a fuel electrode of the first single cell stack structure, and the second topmost connector layer is electrically connected to an air electrode of the second single cell stack structure, such that the first current collector connects the first single cell stack structure and the second single cell stack structure in an electrical serial manner.

In one embodiment, the first single cell stack structure has a first lowest connector layer, and a third through-hole is defined in the first lower frame structure, wherein the second single cell stack structure has a second lowest connector layer, and a fourth through-hole is defined in the second lower frame structure, wherein the fuel cell stack array further comprises a second current collector inserted into the third and fourth through-holes to electrically connect the first and second lowest connector layers to each other.

In one embodiment, the second current collector includes: a connecting electrode portion disposed on bottom faces of the first and second lower frame structures; a first protruding electrode portion protruding from a top face of the connecting electrode portion so as to be inserted into the third through-hole and to be electrically connected to the first lowest connector layer; and a second protruding electrode portion protruding from a top face of the connecting electrode portion so as to be inserted into the fourth through-hole and to be electrically connected to the second lowest connector layer, wherein the second protruding electrode portion is spaced from the first protruding electrode portion.

In one embodiment, the fuel cell stack array further includes: a base support disposed on a bottom face of the second current collector for supporting the first and second fuel cell stacks.

In one embodiment, a flow channel is defined in the base support, wherein the flow channel communicates with an external fuel supply or an external air supply for supplying fuel or air to the first fuel cell stack and the second fuel cell stack.

According to the present disclosure, by forming the relatively large through-hole that exposes at least 50% of the first connector layer to the upper frame structure of the first and second fuel cell stacks and surface contacting the first connector layers of the first and second fuel cell stacks and the first current collector, the contact resistance between the first connector layers and the first current collector may be significantly reduced, thereby remarkable improving the current collection efficiency.

In addition, a stable electrical connection portion of the first current collector and the first connector layers may be achieved by pressing the first current collector to the first connector layers via the pressuring jig.

Further, by forming the through-hole exposing the third connector layer in the lower frame structure of the first and second fuel cell stacks and surface contacting the third connector layers of the first and second fuel cell stack and the second current collector, the current collection efficiency may be further improved.

BRIEF DESCRIPTION OF THE DRAWINGS

FIG. 1 is a cross-sectional view illustrating a fuel cell stack array according to an embodiment of the present disclosure.

FIG. 2 is a partial exploded cross-sectional view of the fuel cell stack array shown in FIG. 1.

DETAILED DESCRIPTIONS

Hereinafter, an embodiment of the present disclosure will now be described in detail with reference to the accompanying drawings. The present disclosure is intended to illustrate certain embodiments of the present disclosure and to explain the present disclosure in detail in the text, as it may make various changes and may take various forms. It should be understood, however, that the present disclosure is not intended to be limited to any particular form of disclosure, but includes all modifications, equivalents, and alternatives falling within the spirit and scope of the present disclosure. Throughout the disclosure, like reference numerals refer to like parts throughout the various FIGS. and embodiments of the present disclosure. In the accompanying drawings, the dimensions of the structures are shown enlarged or reduced in order to clarify the present disclosure.

Furthermore, terms used in this application are simply used to describe particular embodiments and are not intended to limit the present disclosure. The singular representation includes a plural representation, unless otherwise indicated in a clearly different manner on the context. In this application, it should be understood that terms such as "includes" "comprises" or "has" are used to specify the presence of features, numbers, steps, operations, elements, parts or a combination thereof described in the specification, rather than excluding possibility of presence or addition of one or more other features, numbers, steps, operations, elements, parts or a combination thereof in advance.

Unless otherwise defined, all terms, including technical and scientific terms, used in this specification have the same meaning as commonly understood by a person having ordinary skill in the art to which the present disclosure pertains.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a cross-sectional view illustrating a fuel cell stack array according to an embodiment of the present disclosure. FIG. 2 is an exploded cross-sectional view of the fuel cell stack array shown in FIG. 1.

Referring to FIG. 1 and FIG. 2, a fuel cell stack array 1000 according to an embodiment of the present disclosure may include a first fuel cell stack 1100, a second fuel cell stack 1200 disposed adjacent to the first fuel cell stack 1000, a first current collector 1300 for electrically connecting topmost connector layers 1113A and 1213A of the first and second fuel cell stacks 1100 and 1200 to each other, a pressing jig 1400 for pressing the first current collector 1300 against the first and second fuel cell stacks 1100 and 1200, and a fastener 1500 for fastening each of the pressing jigs 1400 to each of the first and second fuel cell stacks 1100 and 1200.

Each of the first and second fuel cell stacks 1100 and 1200 may include a single cell stack structure 1110 and 1210, an upper frame structure 1120 and 1220, and a lower frame structure 1130 and 1230.

Each of the single cell stack structures 1110 and 1210 may include a plurality of single cells 1111 and 1211, a plurality of cell frames 1112 and 1212 for supporting edges of the single cells 1111 and 1211, and a plurality of connector layers 1113 and 1213 for electrically connecting the single cells 1111 and 1211. Each of the single cell stack structures 1110 and 1210 may have a structure in which the corresponding cell frames 1112 and 1212 and the corresponding connector layers 1113 and 1213 are alternately stacked on top of another.

Each of the single cells 1111 and 1211 may be a planar single cell of the fuel cell. For example, each of the single cells 1111 and 1211 may be a planar single cell of, for example, a solid oxide fuel cell (SOFC), a polymer electrolyte fuel cell (PEMFC), a phosphoric acid fuel cell (PAFC), and a molten carbonate fuel cell (MCFC), and the like.

In one embodiment, when each of the single cells 1111 and 1211 is a planar single cell of the solid oxide fuel cell, each of the single cells 1111 and 1211 may include a first electrode, a second electrode, and a solid oxide electrolyte disposed therebetween. One of the first electrode and the second electrode may be a fuel electrode (anode) to which fuel is supplied, and the other electrode thereof may be an air electrode (cathode) to which air is supplied. When the fuel containing hydrogen (H2) and the air containing oxygen (O2) are supplied to the fuel electrode and air electrode respectively, an oxygen ion (O2-) reduced in the air electrode due to an oxygen partial pressure difference is moved to the fuel electrode through the electrolyte 1113, and, then, the oxygen ion (O2-) transferred to the fuel electrode reacts with the hydrogen (H2) supplied to the fuel electrode to produce water (H2O) and an electron (e-). Each of the single cells 1111 and 1211 may generate an electric energy using the electron generated via the above-mentioned reaction.

Each of the cell frames 1112 and 1212 supports each of edge portions of the single cells 1111 and 1211, such that an assemblability and a durability of the first and second fuel cell stacks 1100 and 1200 may be improved. In one embodiment, each of the cell frames 1112 and 1212 may have a frame structure in a form of a square frame in which an opening for a channel for exposing a lower electrode among the first and second electrodes of each of the supported single cells 1111 and 1211 is formed centrally.

Each of the connector layers 1113 and 1213 may electrically connect the adjacent single cells 1111 and 1211 to each other and may transfer the electric energy generated by the single cells 1111 and 1211 to the outside. To this end, each of the connector layers 1113 and 1213 may be made of a conductive ceramic or a metal material. For example, each of the connector layers 1113 and 1213 may be made of a LaCrO3-based ceramic material having a perovskite structure or an iron (Fe)-chromium (Cr)-based metal material. In addition, each of the connector layers 1113 and 1213 may have a rectangular plate structure having the same shape as that of each of the cell frames 1112 and 1212.

Each of the connector layers 1113 and 1213 may include each of first connector layers 1113A and 1213A disposed between each of the upper frame structures 1120 and 1220 and each of topmost single cells among the single cells 1111 and 1112, a plurality of second connector layers 1113B and 1213B disposed between the single cells 1111 and 1211, and each of third connector layers 1113C and 1213C disposed between each of the lower frame structures 1130 and 1230 and each of bottom single cells among the single cells 1111 and 1112. Each of the second connector layers 1113B and 1213B may electrically connect the corresponding adjacent single cells 1111 and 1211 to each other, and each of the first connector layers 1113A and 1213A and each of the third connector layers 1113C and 1213C may transfer the electric energy generated from the single cells 1111 and 1211 to an external circuit.

Each of the upper frame structures 1120 and 1220 and each of the lower frame structures 1130 and 1230 are respectively disposed above and below each of the single cell stack structures 1110 and 1210 such that uniform pressure may be applied to each of the single cell stack structures 1110 and 1210. In one embodiment, although not shown in the drawings, at least one of each of the upper frame structures 1120 and 1220 and each of the lower frame structures 1130 and 1230 may be connected to an external fuel supply (not shown) and an external air supply (not shown), and a flow path for supplying or discharging the fuel and the oxygen may be formed in at least one of each of the upper frame structures 1120 and 1220 and each of the lower frame structures 1130 and 1230.

In one embodiment, each of the upper frame structures 1120 and 1220 may have one or more first through-holes defined therein for exposing each of the first connector layers 1113A and 1213A to the outside. An area and a shape of the first through-hole may vary widely. For example, the first through-hole may have a rectangular shape such that at least about 50% of a top face of each of the first connector layers 1113A and 1213A is exposed to the outside.

The first current collector 1300 may be made of an electrically conductive material and may electrically connect the first connector layers 1113A and 1213A of the first and second fuel cell stacks 1100 and 1200 to each other.

In one embodiment, the first current collector 1300 may include a first contact 1310 inserted into the first through-hole of the upper frame structure 1120 of the first fuel cell stack 1100 and electrically connected to the first connector layer 1113A of the first fuel cell stack 1100, a second contact 1320 inserted into the first through-hole of the upper frame structure 1220 of the second fuel cell stack 1200 and electrically connected to the first connector layer 1213A of the second fuel cell stack 1200, and a connection portion 1330 disposed above the upper frame structures 1120 and 1220 of the first and second fuel cell stacks 1100 and 1200 for connecting the first contact 1310 and the second contact 1320.

Further, as shown in FIG. 1 and FIG. 2, each of the first and second contacts 1310 and 1320 may include a bottom portion disposed on each of the first connector layers 1113A and 1213A inside the first through-hole of each of the upper frame structures 1120 and 1220 and electrically connected to each of the first connector layers 1113A and 1213A, and sidewall portions extending from edges of the bottom portion along sidewalls of the upper frame structures 1120 and 1220 and connecting the bottom portion and the connection portion 1330. In one embodiment, the bottom portion of the first and second contact 1310 and 1320 may also be in direct surface contact with the first connector layers.

On the other hand, a conductive paste, a conductive mesh structure, a conductive elastic plate, and the like may be disposed between the bottom portion of the first and second contact 1310 and 1320 and the a first connector layer 113A and 1213A, such that the bottom portion of the first and second contact 1310 and 1320 may be electrically connected to the first connector layer 1113A and 1213A respectively via these.

In one embodiment, the first and second contacts 1310 and 1320 and the connection portion 1330 of the first current collector 1300 may be integrally formed using a conductive plate. For example, the first current collector 1300 may be formed by bending a portion of the conductive plate having a width less than a width of the first through-hole of the first and second fuel cell stack 1100 and 1200 and a constant length, and inserting the portion of the conductive plate into the first through-hole of the first and second cell stack 1100 and 1200.

The pressing jig 1400 may press the first current collector 1300 onto the first and second fuel cell stacks 1100 and 1200. In one embodiment, the pressing jig 1400 may include a first pressing jig 1410 for pressing the first contact 1310 against the first connector layer 1113A of the first fuel cell stack 1100 and a second pressing jig 1420 for pressing the second contact 1320 against the first connector layer 1213A of the second fuel cell stack 1200.

In one embodiment, the first pressing jig 1410 may include a first plate portion 1411 disposed outside the first through-hole of the upper frame structure 1120 of the first fuel cell stack 1100 and pressing the connection portion 1330 of the first current collector 1300 against a top face of the upper frame structure 1120, and a first protruding portion 1412 protruding from a bottom face of the first plate portion 1411 and inserted into the first through-hole of the upper frame structure 1120 to press the first contact 1310 of the first current collector 1300 against the first connector layer 1113A of the first fuel cell stack 1100. In addition, the second pressing jig 1420 may include a second plate portion 1421 disposed outside the first through-hole of the upper frame structure 1220 of the second fuel cell stack 1200 and pressing the connection portion 1330 of the first current collector 1300 against a top face of the upper frame structure 1220, and a second protruding portion 1422 protruding from a bottom face of the second plate portion 1421 and inserted into the first through-hole of the upper frame structure 1220 to press the second contact 1320 of the first current collector 1300 against the first connector layer 1213A of the second fuel cell stack 1200. Each of the first and second protruding portions 1412 and 1422 may have a circular or polygonal columnar shape with a flat bottom face.

The fastener 1500 may fasten the pressing jig 1400 to each of the first and second fuel cell stacks 1100 and 1200. In one embodiment, the fastener 1500 may include a first fastener 1510 for fastening the first pressing jig 1410 to the upper frame structure 1120 of the first fuel cell stack 1100, and a second fastener 1520 for fastening the second pressing jig 1420 to the upper frame structure 1220 of the second fuel cell stack 1200. Each of the first and second fasteners 1510 and 1520 may include a plurality of fastening screws as shown in FIG. 1, in this case, each of the first and second pressing jigs 1410 and 1420 may control pressures to each of the first connector layers 1113A and 1213A of the first and second fuel cell stack 1100 and 1200 via the fastening screws.

In one embodiment, the fuel cell stack array 1000 according to the embodiment of the present disclosure may include a second current collector 1600 for electrically connecting third connector layers 1113C and 1213C, which are lowest connector layers of the first and second fuel cell stacks 1100 and 1200 to each other, and a base support 1700, which is placed below the second current collector 1600 to support the first and second fuel cell stacks 1100 and 1200. In this case, at least one second through-holes for exposing each of the third connector layers 1113C and 1213C may be formed in each of the lower frame structures 1130 and 1230 of the first and second fuel cell stack 1100 and 1200.

The second current collector 1600 may include a connecting electrode portion 1610 disposed below the lower frame structures 1130 and 1230 of the first and second fuel cell stacks 1100 and 1200, a first protruding electrode portion 1620 protruding from a top face of the connecting electrode portion 1610 and electrically connected to the third connector layer 1113C of the first fuel cell stack 1130 via passing through the second through-hole of the first fuel cell stack 1100, and a second protruding electrode portion 1630 protruding from the top face of the connecting electrode portion 1610 and electrically connected to the third connector layer 1213C of the second fuel cell stack 1200 via passing through the second through-hole of the second fuel cell stack 1200. In one embodiment, the connecting electrode portion 1610 may have a plate structure, and each of the first and second protruding electrode portions 1620 and 1630 may have a columnar structure of a circular or polygonal cross-section having a flat top face.

The base support 1700 may be placed below the second current collector 1600 to support the first and second fuel cell stacks 1100 and 1200. In other words, the base support 1700 may function as a support frame supporting the fuel cell stacks. The base support 1700 may be formed of an insulating material for insulation with the second current collector 1600 or may have an insulating film on the top face in contact with the second current collector 1600. In one embodiment, a flow path through which the fuel or the air may flow or a pipe forming a flow path may be formed inside the base support 1700. For example, a flow path connected to an external fuel supply (unshown) or an air supply (unshown) for supplying the fuel or the air to the first fuel cell stack 1100 and the second fuel cell stack 1200 may be formed inside the base support 1700.

In one embodiment, when the first and second current collector 1300 and 1600 is used, the first fuel cell stack 1100 and the second fuel cell stack 1200 may be electrically connected in parallel or in series.

In one embodiment, when both the first fuel cell stack 1100 and the second fuel cell stack 1200 are positioned such that air electrodes are positioned at the lower portion thereof and fuel electrodes are positioned at the upper portion thereof or the fuel electrodes are positioned at the lower portion thereof and the air electrodes are positioned at the upper portion thereof, the first fuel cell stack 1100 and the seconn fuel cell stack 1200 may be electrically connected in parallel via the first and second current collectors 1300 and 1600.

On the other hand, in another embodiment, when the first fuel cell stack 1100 is positioned such that the air electrode is positioned at the lower portion thereof and the fuel electrode is positioned at the upper portion thereof, and the second fuel cell stack 1200 is positioned such that the fuel electrode is positioned at the lower portion thereof and the air electrode is positioned at the upper portion thereof, or when the first fuel cell stack 1100 is positioned such that the fuel electrode is positioned at the lower portion thereof and the air electrode is positioned at the upper portion thereof, and the second fuel cell stack 1200 is positioned such that the air electrode is positioned at the lower portion thereof and the fuel electrode is positioned at the upper portion thereof, the first fuel cell stack 1100 and the second fuel cell stack 1200 may be electrically connected in series via the first and second current collectors 1300 and 1600.

In one embodiment, each of the first and second fuel cell stacks 1100 and 1200 may include a stack fastening member (unshown) passing through the single cell stack structure 1110 and 1210, the upper frame structure 1120 and 1220 and the lower frame structure 1130 and 1230 in order to improving the assemblability and applying a uniform pressure to each of the single cell stack structures 1110 and 1210. Further, the stack fastening members may be fastened to the base support 1700 to securely secure the first and second fuel cell stacks 1100 and 1200 on the base support 1700. For example, the stack fastening members of the first and second fuel cell stacks 1100 and 1200 may be screw fastened to the base support 1700.

According to the present disclosure, by forming a relatively large through-hole that exposes at least 50% of the first connector layer to the upper frame structure of the first and second fuel cell stack, and surface contacting the first connector layer of the first and second fuel cell stack with the first current collector through the through-hole, the contact resistance between the first connector layer and the first current collector may be significantly reduced, such that the current collection efficiency may be remarkably improved. In addition, a stable electrical connection portion of the first current collector and the first connector layers may be achieved by pressing the first current collector to the first connector layers via the pressuring jig.

Further, the current collecting efficiency may be further improved by forming the through-hole exposing the third connector layer in each of the lower frame structures of the first and second fuel cell stack and surface contacting the third connector layers of the first and second fuel cell stacks with the second current collector via the through-holes.

Although the above description has been made with reference to the preferred embodiment of the present disclosure, those skilled in the art will appreciate that various modifications and changes are possible, without departing from the spirit and scope of the present disclosure as set forth in the following claims.

What is claimed is:

1. A fuel cell stack array comprising:
   a first fuel cell stack including:
      a first single cell stack structure, wherein the first single cell stack structure has a first topmost connector layer;
      a first upper frame structure disposed on a top of the first topmost connector layer and having a first through-hole defined therein; and
      a first lower frame structure disposed on a bottom of the first single cell stack structure;
   a second fuel cell stack including:
      a second single cell stack structure, wherein the second single cell stack structure has a second topmost connector layer;
      a second upper frame structure disposed on a top of the second topmost connector layer and having a second through-hole defined therein; and
      a second lower frame structure disposed on a bottom of the second single cell stack structure, wherein the second fuel cell stack is adjacent to the first fuel cell stack; and
   a first current collector including:
      a first contact inserted into the first through-hole and electrically connected to the first topmost connector layer;
      a second contact inserted into the second through-hole and electrically connected to the second topmost connector layer; and
      a connection portion disposed on tops of the first and second upper frame structures for electrically connecting the first and second contacts,
   wherein the first current collector electrically connects the first and second topmost connector layers, and
   wherein, through the first through-hole, at least 50% of a top surface of the first topmost connector layer is exposed and surface-contacts the first contact of the first current collector.

2. The fuel cell stack array of claim 1, wherein the first contact includes:
   a first bottom portion disposed on the first topmost connector layer and in the first through-hole; and
   a first sidewall portion vertically extending from an edge of the first bottom portion and along a sidewall of the first upper frame structure defined by the first through-hole, wherein the first sidewall portion is connected to the connection portion,
   wherein the second contact includes:
      a second bottom portion disposed on the second topmost connector layer and in the second through-hole; and
      a second sidewall portion vertically extending from an edge of the second bottom portion and along a sidewall of the second upper frame structure defined by the second through-hole, wherein the second sidewall portion is connected to the connection portion.

3. The fuel cell stack array of claim 2, wherein a first conductive paste, conductive mesh structure, or conductive elastic plate is disposed between the first bottom portion and the first topmost connector layer, and
   wherein a second conductive paste, conductive mesh structure, or conductive elastic plate is disposed between the second bottom portion and the second topmost connector layer.

4. The fuel cell stack array of claim 1, further including:
   a first pressing jig for pressing the first contact against the first topmost connector layer; and
   a second pressing jig for pressing the second contact against the second topmost connector layer.

5. The fuel cell stack array of claim 4,
   wherein the first pressing jig includes:
      a first plate portion disposed outside the first through-hole for pressing the connection portion of the first current collector against the first upper frame structure; and
      a first protruding portion protruding from a bottom face of the first plate portion and inserted into the first through-hole to press the first contact against the first topmost connector layer, and
   wherein the second pressing jig includes:
      a second plate portion disposed outside the second through-hole for pressing the connection portion of the first current collector against the second upper frame structure; and
      a second protruding portion protruding from a bottom face of the second plate portion and inserted into the second through-hole to press the second contact against the second topmost connector layer.

6. The fuel cell stack array of claim 5, further including: a first fastener for fastening the first pressing jig to the first upper frame structure; and a second fastener for fastening the second pressing jig to the second upper frame structure.

7. The fuel cell stack array of claim 6, wherein the first fastener includes a plurality of first fastening screws passing through the first pressing jig so as to be inserted into the first upper frame structure, and
   wherein the second fastener includes a plurality of second fastening screws passing through the second pressing jig so as to be inserted into the second upper frame structure.

8. The fuel cell stack array of claim 1, wherein the first topmost connector layer is electrically connected to a fuel electrode of the first single cell stack structure, and the second topmost connector layer is electrically connected to a fuel electrode of the second single cell stack structure, such that the first current collector connects the first single cell stack structure and the second single cell stack structure in an electrical parallel manner.

9. The fuel cell stack array of claim 1, wherein the first topmost connector layer is electrically connected to a fuel electrode of the first single cell stack structure, and the second topmost connector layer is electrically connected to an air electrode of the second single cell stack structure, such that the first current collector connects the first single cell stack structure and the second single cell stack structure in an electrical serial manner.

10. The fuel cell stack array of claim 1, wherein the first single cell stack structure has a first lowest connector layer, and a third through-hole is defined in the first lower frame structure,
    wherein the second single cell stack structure has a second lowest connector layer, and a fourth through-hole is defined in the second lower frame structure, and
    wherein the fuel cell stack array further comprises a second current collector inserted into the third and fourth through-holes to electrically connect the first and second lowest connector layers to each other.

11. The fuel cell stack array of claim 10, wherein the second current collector includes:
    a connecting electrode portion disposed on bottom faces of the first and second lower frame structures;
    a first protruding electrode portion protruding from a top face of the connecting electrode portion so as to be inserted into the third through-hole and to be electrically connected to the first lowest connector layer; and
    a second protruding electrode portion protruding from a top face of the connecting electrode portion so as to be inserted into the fourth through-hole and to be electrically connected to the second lowest connector layer,
    wherein the second protruding electrode portion is spaced from the first protruding electrode portion.

12. The fuel cell stack array of claim 10, further including a base support disposed on a bottom face of the second current collector for supporting the first and second fuel cell stacks.

13. The fuel cell stack array of claim 12, wherein a flow channel is defined in the base support, and
    wherein the flow channel communicates with an external fuel supply or an external air supply for supplying fuel or air to the first fuel cell stack and the second fuel cell stack.

* * * * *